(12) United States Patent  
Habibi-Naini

(10) Patent No.: US 7,695,183 B2  
(45) Date of Patent: Apr. 13, 2010

(54) STATIC MIXER APPARATUS FOR IMPREGNATING A POLYMER MELT WITH A FLUID EXPANDING AGENT OR ADDITIVE

(75) Inventor: Sasan Habibi-Naini, Rikon (CH)

(73) Assignee: Sulzer Chemtech AG, Winterthur (CH)

( * ) Notice: Subject to any disclaimer, the term of this patent is extended or adjusted under 35 U.S.C. 154(b) by 1028 days.

(21) Appl. No.: 11/408,147

(22) Filed: Apr. 20, 2006

(65) Prior Publication Data

US 2007/0036029 A1 Feb. 15, 2007

(30) Foreign Application Priority Data

Apr. 25, 2005 (EP) .................................. 05405314

(51) Int. Cl.  
*B29B 7/74* (2006.01)
(52) U.S. Cl. .................. 366/87; 366/340; 425/197; 264/51
(58) Field of Classification Search .................. 366/87, 366/101, 336–341; 425/197; 264/50, 51, 264/DIG. 5  
See application file for complete search history.

(56) References Cited

U.S. PATENT DOCUMENTS

| 3,316,335 | A | * | 4/1967 | Snella et al. | .................. 264/50 |
| 3,792,839 | A |   | 2/1974 | Gidge |   |
| 4,150,932 | A | * | 4/1979 | Moghe | ........................ 425/197 |
| 7,303,706 | B2 | * | 12/2007 | Schlummer | ................... 264/51 |
| 2007/0036029 | A1 | * | 2/2007 | Habibi-Naini | .............. 366/341 |
| 2008/0145274 | A1 | * | 6/2008 | Habibi-Naini |   |

FOREIGN PATENT DOCUMENTS

| DE | 4406549 A1 | * | 9/1994 |
| JP | 5-286048 |   | 11/1993 |
| JP | 05286048 A | * | 11/1993 |
| JP | 07237218 A | * | 9/1995 |
| WO | WO 03/033232 |   | 4/2003 |

* cited by examiner

*Primary Examiner*—Charles E Cooley  
(74) *Attorney, Agent, or Firm*—Francis C. Hand; Carella, Byrne, Cecchi

(57) ABSTRACT

The apparatus is provided for impregnating a melt of polymer with a fluid working medium, such as, an expanding agent or an additive. Impregnation is carried out for the purpose of manufacturing foamed shaped parts using an injection molding machine. The impregnating body includes at least one melt channel formed in a gas permeable segment and a channel system for fluid infeed. The gas permeable material, e.g. sintered metal, separates the fluid from the stream of melt in the melt channel(s). Each melt channel has open pores at its inner surface which enable the impregnation. The melt channels can contain static mixers in the stream of melt to promote the distribution of the diffused fluid in the flow of melt.

20 Claims, 2 Drawing Sheets

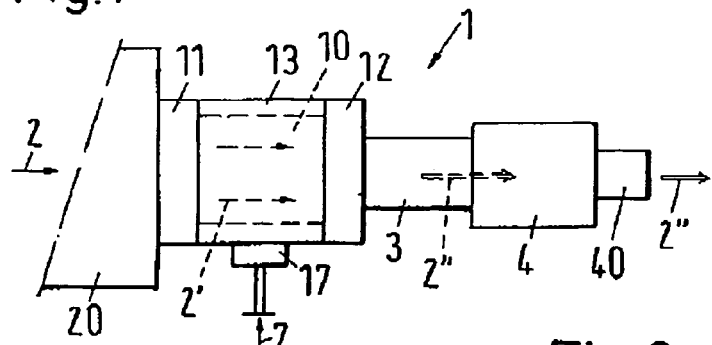
Fig.1 PRIOR ART
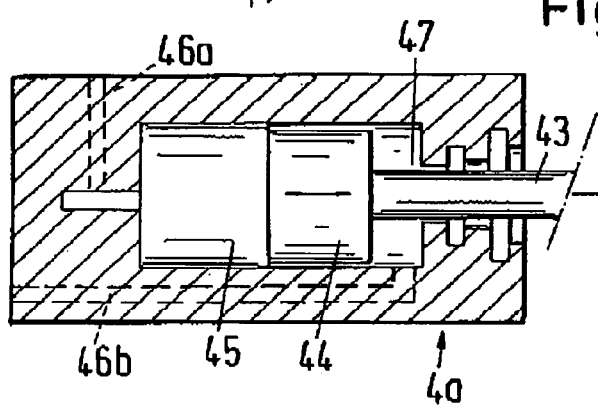 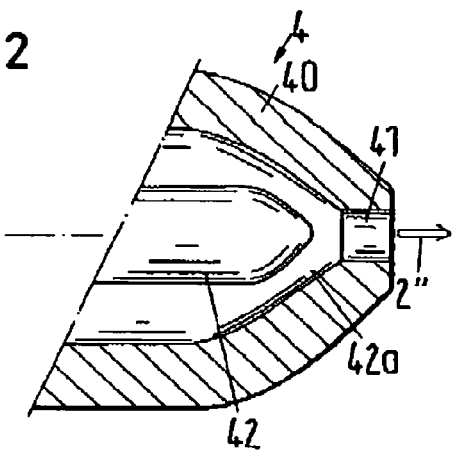
Fig.2
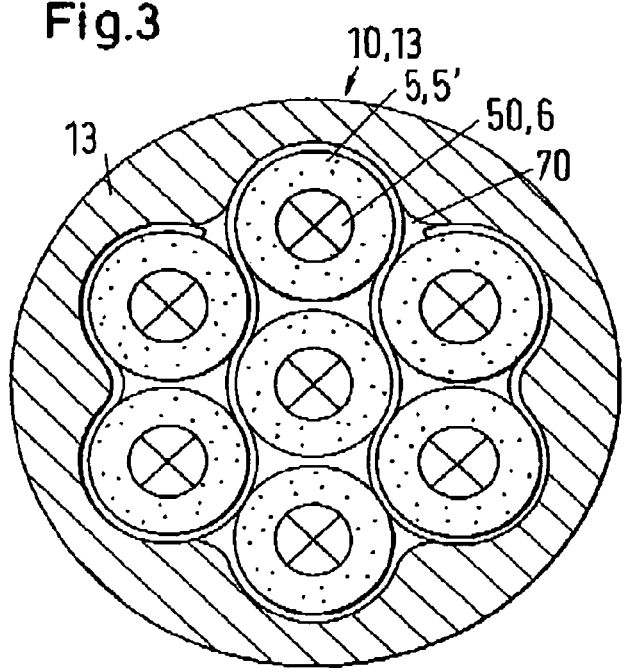 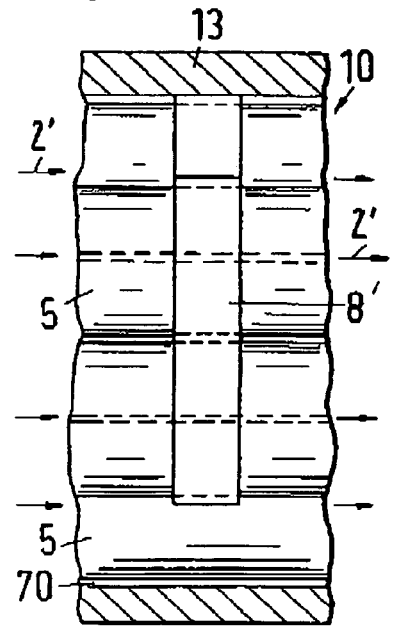
Fig.3   Fig.4

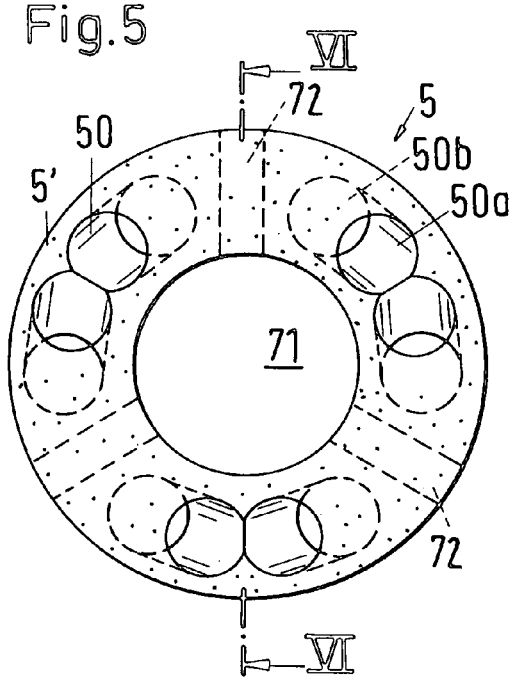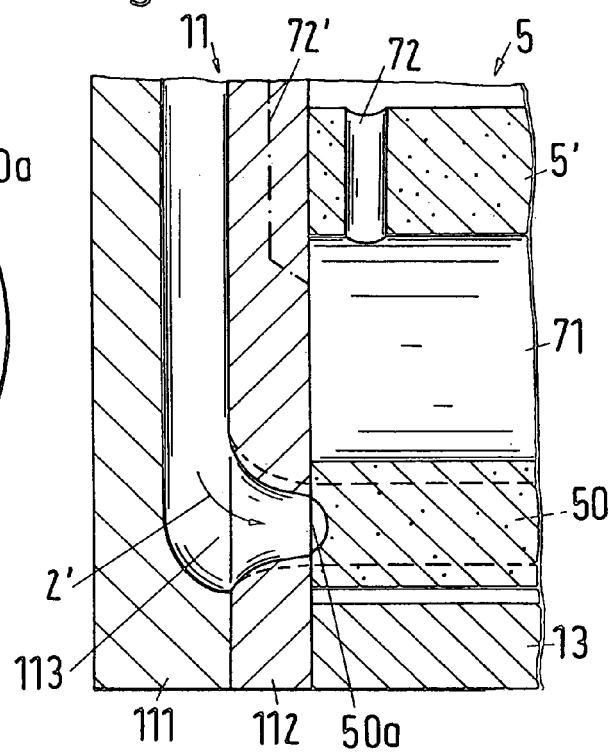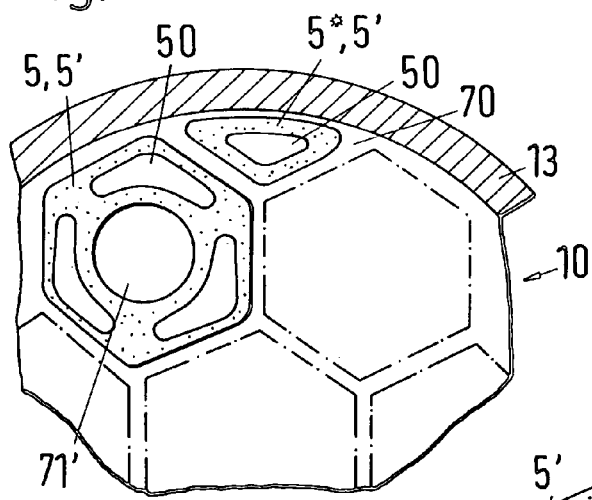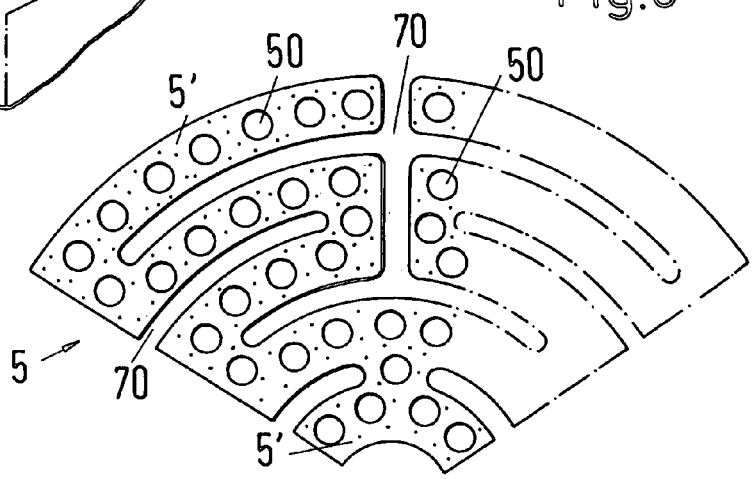

STATIC MIXER APPARATUS FOR IMPREGNATING A POLYMER MELT WITH A FLUID EXPANDING AGENT OR ADDITIVE

This invention relates to an apparatus for impregnating a polymer melt with a fluid expanding agent or additive. More particularly, this invention relates to uses of the apparatus in the manufacture of foamed polymer bodies by means of extrusion or as molded parts in an injection molding machine.

Injection molding methods and corresponding apparatus are described in DE-A-198 53 021 for use in manufacturing foamed polymer molded parts. One apparatus is disclosed that includes a conventional injection molding machine and that uses a physical expanding agent, for example nitrogen, carbon dioxide and water, that can be introduced into a polymer melt using a gas metering system. In accordance with a described embodiment, the expanding agent is brought into contact at the inner surfaces of a ring gap passage with a stream of melt flowing in this passage, so that an impregnation of the polymer with the expanding agent can take place by means of diffusion. The ring gap passage is formed by two hollow cylinders made of porous sintered metal through the walls of which a homogenous gaseous introduction of the expanding agent is made possible over a large boundary surface. An apparatus of this kind manufactured from sintered metal is termed an impregnation body in the following.

The impregnation body including the two hollow cylinders of the known apparatus has the disadvantage that the volume which one has to make available for this apparatus is relatively large. If the flow of the polymer melt to be impregnated is enlarged by a factor S ("scale-up") then the diameter of the impregnation body increases essentially linearly with S. On the other hand, the volume increases quadratically with S. (The length of the ring gap channel is kept constant in this arrangement.) It would be preferable for the volume to increase less significantly, if possible, only linearly with the factor S. In other words, an impregnation capacity of the apparatus should be as proportional as possible to the volume of the impregnation body.

Accordingly, it is the object of the invention to produce an apparatus for impregnating a polymer melt, the impregnation body of which is favourably structured as regards an enlargement of the flow of melt.

It is another object of the invention to provide an apparatus for impregnating a polymer melt that has an impregnation capacity proportional to the volume of an impregnation body therein.

Briefly, the invention provides an apparatus for impregnating a polymer melt that includes an impregnation body having a passage to conduct a flow of fluid working medium therethrough; and a plurality of segments of gas permeable material in the passage with each segment having a melt channel extending from an inlet to an outlet of the passage to conduct a flow of polymer melt therethrough and with each melt channel having open pores between the inlet and the outlet at an inner surface for passage of the fluid working medium therethrough from the passage into the melt channel for diffusion and impregnation into the polymer melt.

In addition, a plurality of static mixers are disposed in each melt channel for promoting the distribution of the diffused fluid working medium in the flow of polymer melt.

The fluid working medium can be an expanding agent or an additive. An impregnation with an expanding agent is carried out, in particular, for the purpose of manufacturing foamed shaped parts.

The melt channels are produced in the gas permeable segments by means of material removal from a homogenous piece of the gas permeable material. Each melt channel has open pores on its inner surface between the inlet and the outlet which facilitate the impregnation.

The melt channels, the lengths of which are to be established in relation to the cross-sectional shape and the impregnation process, can be distributed in the impregnation body in such a way that the impregnation capacity is proportional to the volume of the impregnation body.

In one embodiment, each gas permeable segment is of tubular shape and receives a plurality of static mixers along the length of the melt channel therein.

In another embodiment, the gas permeable segment has one or more passages for the working medium flow and a plurality of parallel melt channels that conduct the polymer flow. For example, the gas permeable body is of tubular cross-section, such as circular or polygonal, with a passage extending centrally therethrough from an inlet thereof to an outlet thereof to conduct a flow of fluid working medium therethrough. In addition, a plurality of melt channels are formed in the segment between the outer circumferential surface and the inner circumferential surface to conduct flows of a polymer melt therethrough. During operation, the fluid working medium passes through the gas permeable segment into the melt channels and is diffused into the polymer melt in each melt channel.

In still another embodiment, a gas permeable segment is formed with a central working medium passage and a plurality of parallel melt channels with slit-shaped cross-sections about the central passage.

These and other advantages of the invention will become more apparent from the following detailed description taken in conjunction with the accompanying drawings in which:

FIG. 1 schematically illustrates an apparatus for impregnating a polymer melt which is arranged at the head of a plasticizing unit;

FIG. 2 illustrates a cross-sectional view of a needle shut-off nozzle with a hydraulic or pneumatic needle drive that is used in the apparatus of FIG. 1;

FIG. 3 illustrates a cross-sectional view through an impregnation body in accordance with the invention;

FIG. 4 illustrates a part cross-sectional side view of the impregnation body of FIG. 3;

FIG. 5 illustrates an end view of a modified gas permeable segment in accordance with the invention;

FIG. 6 illustrates a part longitudinal section through the segment of FIG. 5;

FIG. 7 illustrates a part cross-sectional view of a further embodiment of an impregnation body in accordance with the invention; and FIG. 8 illustrates a cross-section view through a further embodiment of a gas permeable segment in accordance with the invention which has the shape of a sector of a circle.

Referring to FIG. 1, a known apparatus 1 for impregnating a stream of polymer melt 2' is arranged at a plasticizing unit 20 in which an initially granular polymer is plasticized by means of a screw cylinder (not shown) while being heated and is thus reshaped into the stream of melt 2'. This stream then passes through an impregnation body 10 where a fluid working medium 7 delivered via a connection 17 is diffused into the flow of polymer melt and the resultant mixture 2" delivered through an intermediate piece 3 that contains a static mixer into and through a shut-off organ 4.

The impregnation body 10 is located between a cover 11 and a base 12 that is longitudinally spaced from the cover 11 and within a tubular jacket 13 disposed between the cover 11 and the base 12. The impregnation body 10 has an annular gap-shaped melt channel and includes a channel system with parallel channels for a fluid working medium that are separated from the melt channel by gas permeable material, namely by sintered metal.

The shut-off organ 4 advantageously includes a needle shut-off nozzle as is illustrated in FIG. 2. This nozzle 4 has tip 40 with an opening 41 that can be closed by a needle 42. The needle 42 is held in a closed position by a hydraulic or pneumatic working medium, with this fluid working medium being, for example, a compressed, supercritical gas. The same fluid gas 7 used for the fluid working medium can also be used for the impregnation of the polymer melts. If the pressure of the stream of melt 2' exceeds a maximum pressure determined by the fluid working medium, then the impregnated melt 2" escapes at the tip 40 of the shut-off organ 4. The tip 40 is connected to a not illustrated injection molding machine with which, for example, foamed shaped polymer parts can be manufactured.

Referring to FIG. 2, the shut-off organ 4 also includes a hydraulic or pneumatic needle drive 4a with which the needle 42 is pressed onto a valve seat 42a for the closing of the opening 41. The fluid working medium exerts a closing pressure via a passage-like connection 46a on a piston 44, which can be moved to and fro in a cylinder 45 and which is rigidly connected to the needle 42 via a rod 43. Fluid working medium is drained out of the cylinder 45 during a closing movement through a second connecting passage 46b. A seal 47 prevents the polymer melt 2" from entering the cylinder 45. If there is an undesired build-up of pressure in the melt, the shut-off organ 4 opens passively and thus makes such a release of pressure possible. (An active opening is also possible when pressure is applied by means of the connecting passage 46b and released via the connection 46a).

The fluid 7 with which the stream of melt 2' is impregnated in the impregnation body 10 of the apparatus 1 is an expanding agent or an additive. Examples of additives are: a dye, a medicament, a processing aid such as for example an antiblocking additive, a fire-proofing agent or a cross linking agent with reacting molding material. The additive is fed through the connection 17 into the apparatus 1 and is distributed therein in a channel system for the fluid infeed.

In accordance with the invention, the impregnation body 10 includes a plurality of melt channels. The melt channels are, for example, respectively manufactured by material removal from a homogenous piece of the gas permeable material. The removal of material is carried out by means of spark erosion in particular so that each melt channel has open pores at the inner surface between an inlet and an outlet. These open pores facilitate the impregnation of the stream of melt 2' with the fluid 7 which is pressed into the pores of the gas permeable material.

The porous impregnation body 10 can also be manufactured by means of a shaping method without substantial material removal, for example by pressing metal powder to a green compact (body) containing channels, which is ultimately sintered and, if necessary, finish machined.

The melt channels can contain static mixers by means of which the distribution of the fluid which has been brought into the stream of melt 2' can be improved.

All the melt channels are formed to be largely equivalent or identical with regard to shape and arrangement—in particular with regard to an arrangement with respect to the channel system for the infeed of fluid, so that the same amount of fluid 7 can be taken up by the stream of melt 2' in each melt channel, except for deviations of 10% at the most, preferably 1% specifically, i.e. related to the mass. This applies, for example, to the impregnation body 10 as illustrated in FIGS. 3 and 4. If all the melt channels are of equivalent design then the impregnation capacity of the apparatus 1 is substantially proportional to the number of the melt channels and thus—if the distribution is uniform— is also proportional to the volume of the impregnation body. A uniform distribution of the melt channels is present in the embodiments described below.

Referring to FIG. 3, the impregnation body 10, in accordance with the invention, is formed of tubular shape with a longitudinally disposed passage 70 to conduct a flow of fluid working medium therethrough and has a plurality of segments 5 of gas permeable material 5' disposed in the passage in parallel.

Each segment 5 is a tube, the lumen of which has the function of a melt channel 50 and which contains static mixers 6.

The segments 5 are arranged in a space-saving manner in the passage 70 of the impregnation body 10 (housing casing 13) with gaps between the segments 5. These gaps form a part of the channel system for the feeding in of the fluid working medium 7 in the passage 70. The gaps are kept free by means of spacing elements 8 and these elements 8 can be used additionally as support elements for mechanical strengthening of the impregnation body 10. In the illustrated example, the spacing elements 8 are formed in brace-like manner and are manufactured by forming one metal strip in each case. The side view in FIG. 4 shows a single such spacing element 8.

A plurality of the spacing elements 8 are used and the individual elements 8 are advantageously placed with different orientations. As can be seen from FIG. 3, there are six possible orientations. If the spacing elements 8 are arranged close together in the direction of the channel, they exert a maximum support effect on the segments 5, the gas permeable material 5' of which is not very stable mechanically. If something goes wrong with the pressure of the fluid falling steeply, the non-supported segments 5 could crack.

Referring to FIGS. 5 and 6, wherein like reference characters indicate like parts as above, a gas permeable segment (or element) 5 may be formed with a central passage 71 for a flow of fluid working medium and a plurality of melt channels in communication with the passage 71. The illustrated gas permeable segment (element) 5 is located adjacent a two-part lid 11 and within the casing 13 to define a gap therebetween.

The gas permeable element 5 also has connection channels 72 that extend from the inner circumferential surface of the element 5 to the outer circumferential surface of the element 5 to communicate the central passage 71 with the outer circumferential surface and the remainder of the channel system. The central cavity 71 and the connection channels 72 are parts of the channel system for feeding in the fluid working medium 7.

The melt channels 50, which have a circular cross-section, each connect one inlet cross-section 50a with one outlet cross-section 50b. The channels 50 are slightly inclined relative to the axis of the central cavity 71 and in such a manner that space is made for the connection channels 72 in the region of the inlet cross-sections 50a. There are no static mixers arranged in the melt channels 50.

The melt channels 50 can also be lined up unidirectionally and parallel to the axis of the passage 71 and element 5. In this case, it is advantageous to produce a connection of the central cavity 71 to the further channel system 70 in the lid 11 as is suggested by the chain dotted line 72' in FIG. 6.

The melt channels 50 are connected to each other in their inlet and outlet regions via melt distributors or collectors and thus form a parallel connection. The lid 11 is made up of two layers 111 and 112 (the same applies to the base 12) whereby guide structures 113 are worked into in these layers 111, 112 for the purpose of distribution (or collection in the base 12) of the stream of melt 2'. The shaping of the guide structures 113 is carried out to be favorable to the flow so that no stagnation zones form in the stream of melt 2'. The inlet and outlet regions of the melt channels 50' can also be funnel-shaped for example (not illustrated) so that they have a flow favourable form.

When manufacturing open pores on surfaces of the impregnation body 10 and, in particular, when manufacturing the open pores at the inner surfaces of the melt channels 50, the material removal is advantageously carried out by means of spark erosion. An at least partial pore closure can be produced at selected positions by means of a chip forming machining process. In this arrangement, a coating can be additionally provided for the purpose of a further sealing and, if necessary, a hardening. A treatment of this kind can be advantageous at the end walls of the segments 5, where these are in contact with the lid 11 or base 12. The connection channels 72 can be produced by means of a chip forming boring process, since these channels 72 do not have to have any open pores.

All or a plurality of the segments 5 are identically formed. The segments 5 are columnar or prismatic, with the cross-section of the segment 5 preferably being circular or hexagonal.

The gas permeable element 5 may be used alone within a casing 13 or with other like elements in an arrangement as shown in FIG. 3. When a gas premeable element 5 is used monolithically, the connection channels 72 that extend from the inner circumferential surface of the element 5 to the outer circumferential surface of the element 5 communicate the central passage 71 with the annular gap between the element and the casing 13 through which the fluid working medium passes.

A further embodiment of the impregnation body 10 is shown in FIG. 7, in which a plurality of hexagonal segments 5 form a regular arrangement with the symmetry of a honey-comb structure. Additional segments 5* which have a smaller cross-section with only one melt channel 50 fill gaps in the external zone of the impregnation body 10 at the jacket 13 which can not be filled by the honey-comb structure. Three melt channels 50 with slit-shaped cross-sections are arranged in the hexagonal segments 5 respectively about a central cavity 71' which forms part of the channel system 70 for fluid infeed by means of a communicating connection (not illustrated).

The central cavity 71' is of channel-like form and is arranged parallel to the melt channels 50. Slit-shaped gaps between the segments 5, 5* which form a further part of the channel system 70 for the feeding of fluid are kept free by means of spacing elements 8 (not shown in FIG. 7) as in the embodiments of FIG. 3.

The impregnation bodies 10 of the FIGS. 3 and 7 show a central axis in the flow direction of the flow of melt 2'. The segments 5 form a regular symmetrical arrangement about this central axis and are arranged, in particular, about a central part. This central part can be a segment 5, a filling body or also a drive 4a for a needle shut-off nozzle 4 (see FIG. 2).

The cross-section of the segment 5 can also have the shape of a sector of a circle, in particular, of a blunt sector of a circle in which the sector tip is missing (see FIG. 8). In place of the missing sector tip, an additional central part, for example the needle shut-off nozzle 4 can be provided.

The segment 5 is formed by wall parts of the gas permeable material 5' that are linked meanderingly and by lanes between the wall parts. The lanes are part of the channel system 70 for the feeding in of the fluid 7.

The melt channels 50 are arranged unidirectionally and in the shape of a chain with largely equal spacings of the melt channels 50.

Three of the segments 5 shown in FIG. 8 jointly form the impregnation body 10. The number of the segments can of course also be two or greater than three. In an extreme case, the impregnation body 10 can also be monolithic, consisting only of one part.

A preferred use of the apparatus 1 in accordance with the invention is the impregnation of a melted polymer 2 with a physical expanding agent as fluid 7, namely for the manufacture of foamed shaped parts in an injection molding machine (see FIG. 1). In a further use, the fluid 7 is an additive, which is used for another purpose, for example for the colouring of the polymer 2.

The use of the apparatus may be characterised in that foamed polymer bodies are manufactured by extrusion or a shaped parts in an injection molding machine, wherein the fluid is a physical expanding agent, in particular a gas, preferably carbon dioxide ($CO_2$), Nitrogen ($N_2$), air, a noble gas, water vapor or a mixture of at least two of these gases, or in that the fluid is an additive, namely a dye, a medicament, a processing aid such as an anti-blocking additive, a flame protection means or a cross linking agent with reactive molding compositions.

At the same time, the volume, which is to be made available to the impregnation body should be as small as possible and the impregnation capacity should be increased in correspondence to the flow of melt which is to be increased.

What is claimed is:

1. An impregnation body for a flow of polymer melt characterized in having an outer circumferential surface and an inner circumferential surface, said inner circumferential surface defining a passage for a flow of a fluid working medium extending centrally therethrough from an inlet thereof to an outlet thereof, a plurality of melt channels for parallel flows of polymer melt being disposed between said outer circumferential surface and said inner circumferential surface and walls separating said passage from said melt channels, said walls being made of a permeable material to pass the fluid working medium therethrough into said melt channels.

2. An impregnation body as set forth in claim 1 further having a plurality of connection channels extending from said inner circumferential surface to said outer circumferential surface to communicate said passage with said outer circumferential surface.

3. An impregnation body as set forth in claim 1 further characterized in being made of sintered metal.

4. An apparatus for impregnating a polymer melt comprising an impregnation body having a longitudinally disposed passage to conduct a flow of fluid working medium therethrough;
a plurality of segments of gas permeable material in said passage, each said segment having a melt channel extending therethrough from an inlet thereof to an outlet thereof to conduct a flow of polymer melt therethrough, each said melt channel having open pores between said inlet and said outlet at an inner surface for passage of the fluid working medium from said passage therethrough into said channel for diffusion and impregnation into the polymer melt; and
a plurality of static mixers in each said melt channel for promoting the distribution of the diffused fluid working medium in the flow of polymer melt.

5. An apparatus as set forth in claim 4 further comprising a cover, a base longitudinally spaced from said cover, and a tubular jacket disposed between said cover and said base and having said impregnation body disposed therein and wherein each said melt channel extends in parallel to another melt channel.

6. An apparatus as set forth in claim 5 further comprising a connection connected to said jacket for delivering fluid working medium thereto for passage into said impregnation body.

7. An apparatus as set forth in claim 5 wherein said melt channels are formed to be equivalent with regard to shape and arrangement for fluid infeed whereby substantially the same amount of fluid working medium can be taken up by the flow of polymer melt.

8. An apparatus as set forth in claim 4 wherein said plurality of segments are of identical construction and shape and wherein each segment has a shape selected from one of columnar and prismatic and a cross-section selected from one of circular, hexagonal, a sector of a circle, and a blunt sector of a circle having a missing sector tip.

9. An apparatus as set forth in claim 4 further comprising a plurality of spacing elements disposed about said segments to maintain said segments in spaced relation to each other and to provide gaps for a flow of fluid working medium therethrough.

10. An apparatus for impregnating a polymer melt comprising
an impregnation body having a longitudinally disposed passage to conduct a flow of fluid working medium therethrough; and
a plurality of segments of gas permeable material in said passage, each said segment having a central passage for a flow of fluid working medium and a plurality of melt channels extending therethrough from an inlet thereof to an outlet thereof to conduct a flow of polymer melt therethrough, each said melt channel having open pores between said inlet and said outlet at an inner surface for passage of the fluid working medium from said passage therethrough into said respective melt channels for diffusion and impregnation into the polymer melt therein.

11. An apparatus as set forth in claim 10 wherein each segment is of a cross-sectional shape selected from circular and hexagonal.

12. An apparatus as set forth in claim 10 further comprising a lid at one end of said segments, said lid having guide structures for distributing polymer melt into said melt channels in parallel.

13. An apparatus as set forth in claim 10 wherein each segment has a cross-sectional shape of a sector of a blunt sector of a circle with wall parts linked meanderingly and with lanes between said wall parts for the flow of the fluid working medium.

14. An apparatus as set forth in claim 10 wherein each said melt channel is angularly disposed in said body.

15. An apparatus as set forth in claim 10 wherein said melt channels are in parallel to each other.

16. An apparatus as set forth in claim 10 further comprising a plurality of spacing elements maintaining said segments in radially spaced apart relation.

17. An apparatus as set forth in claim 10 characterised in that said impregnation body has a central axis in the flow direction of a stream of polymer melt and said segments form a regular symmetrical arrangement about said central axis.

18. An apparatus as set forth in claim 10 further comprising a drive for a needle shut-off nozzle disposed centrally of said segments for controlling a flow of polymer melt from said impregnation body.

19. The combination as set forth in claim 10 wherein each said segment is made of sintered metal.

20. An impregnation body for a flow of polymer melt characterized in being of a segmented shape and in having a passage for a flow of a fluid working medium extending therethrough from an inlet thereof to an outlet thereof, a plurality of melt channels for parallel flows of polymer melt and walls separating said passage from said melt channels, said walls being made of a permeable material to pass the fluid working medium therethrough into said melt channels and wherein said segmented shape is that of a sector of a circle and said walls are linked meanderingly with lanes between said walls.

* * * * *